United States Patent [19]

Arima et al.

[11] 4,228,971
[45] Oct. 21, 1980

[54] SEAT BELT RETRACTOR WITH TENSION ELIMINATING MECHANISM

[75] Inventors: Tatsuhiro Arima, Fujisawa; Chusaku Yamanashi, Kosai, both of Japan

[73] Assignees: Nissan Motor Company, Limited, Yokohama; Fuji Kiko Company, Limited, Tokyo, both of Japan

[21] Appl. No.: 23,598

[22] Filed: Mar. 26, 1979

[30] Foreign Application Priority Data

Apr. 6, 1978 [JP] Japan .................................. 53/40485
Apr. 6, 1978 [JP] Japan .................................. 53/40486

[51] Int. Cl.$^3$ ........................ A62B 35/00; B65H 75/48
[52] U.S. Cl. .................................................. 242/107.6
[58] Field of Search ............. 242/107.6, 107.7, 107.12; 297/388; 280/803, 806, 807, 808

[56] References Cited

U.S. PATENT DOCUMENTS

| | | | |
|---|---|---|---|
| 3,908,928 | 9/1975 | Okada | 242/107.6 X |
| 3,912,035 | 10/1975 | Ulert | 242/107.6 X |
| 4,108,395 | 8/1978 | Heath | 242/107.7 |
| 4,124,175 | 11/1978 | Cislak | 242/107.7 |

*Primary Examiner*—John M. Jillions

[57] ABSTRACT

A seat belt retractor with a tension eliminating mechanism comprises a reel on which a webbing is wound up when the reel rotates in one direction, first biasing means biasing the reel to rotate in the one direction, a ratchet wheel journaled on a concentric bearing portion formed on the reel, a toothed stopper arm for stopping rotation of the ratchet wheel when engaged with the same, second biasing means to bias the stopper arm to move in a direction to be disengaged from the ratchet wheel, an external gear journaled on an eccentric bearing portion formed on the reel, third biasing means to bias the ratchet wheel to rotate in the same direction as the one direction relative to the external gear, an internal gear stationarily mounted to the retractor and operatively engaged with the external gear, at least one stud fixed to the external gear, at least one arcuate slot formed in the ratchet wheel to be concentric with the same for spacedly receiving therein the stud, the stud and the slot being so arranged and formed that when the stud is in contact with one longitudinal end of the slot upon engagement of the toothed stopper arm with the ratchet wheel, the external gear becomes fixed so as to be prevented from rotation relative to the internal gear, and an electromagnet for bringing the toothed stopper arm into engagement with the ratchet wheel in response to buckling of the webbing by the passenger.

6 Claims, 11 Drawing Figures

SEAT BELT RETRACTOR WITH TENSION ELIMINATING MECHANISM

FIELD OF THE INVENTION

The present invention relates in general to a safety seat belt arrangement mounted, for example, in motor vehicles, and more particularly to a seat belt retractor of a type having a tension eliminating mechanism.

BACKGROUND OF THE INVENTION

Some of the seat belt retractors are designed to eliminate the tension applied to the wearer's body when the wearer assumes a position in which the lumbar and dorsal portions of the wearer's back are pressed against the backrest of the seat viz. assumes a fully restrained position. These retractors usually have therein a so-called "position memory mechanism" responsive to the belt being drawn out of the retractor in excess of a predetermined length so as to be reset and permit the belt to be retracted only the predetermined length whereby on return of the wearer to the fully restrained position no tension is exerted on his or her body via the belt. One example of these retractors is clearly shown and described in U.S. patent application Ser. No. 933,068 now U.S. Pat. No. 4,172,568. The retractor of this example generally comprises a ratchet wheel disposed coaxially with a webbing take up reel and rotatable relative to the reel, an external gear positioned eccentrically to the reel and rotatable relative to the reel, a stud rigidly mounted on the external gear, an elongate slot formed in the ratchet wheel to be concentric with the wheel for receiving the stud therein, a spring extending between the external gear and the ratchet wheel to bias them in a predetermined phase, an internal gear fixedly mounted to a housing of the retractor concentric with the reel and meshed with the external gear to constitute a speed reduction mechanism, a stop swingably mounted to the housing and blocking the rotation of the ratchet wheel and means for driving the stop into and out of engagement with the ratchet wheel.

OBJECTS OF THE INVENTION

It is an object of the present invention to provide a seat belt retractor having a tension eliminating mechanism by which more reliable tension eliminating function is achieved, without affecting the memory function of the mechanism, in comparison with the retractor of the U.S. patent application mentioned above.

It is another object of the invention to provide a seat belt retractor having a tension eliminating mechanism which can instantly and accurately set the memorized position of the seat belt upon buckling up of the seat belt.

According to the present invention, there is provided a seat belt retractor for a safety seat belt arrangement having a webbing, the retractor comprising: a housing; a reel rotatably mounted in the housing and winding thereon the webbing when the reel is rotated about the axis thereof in one direction, the reel being formed thereon with first and second cylindrical bearing portions which are respectively concentric and eccentric with respect to the longitudinal axis of the reel; first biasing means for biasing the reel to rotate about the axis of the same in the one direction; a wheel journaled on the first cylindrical bearing portion; a stopper for stopping rotation of the wheel about the first cylindrical bearing portion when engaged with the wheel; second biasing means for biasing the stopper to move in a direction to be disengaged from the wheel; an external gear journaled on said second cylindrical bearing portion of the reel; third biasing means for biasing the wheel to rotate in the same direction as the one direction relative to the external gear; an internal gear stationarily connected to the housing at a position to be operatively engageable with the external gear; memorizing means including at least one stud fixed to the external gear and at least one arcuate slot formed in the wheel, the stud being spacedly received in the slot and the arcuate slot being concentric with the first cylindrical bearing portion, the stud and the slot being so arranged and formed that when the stud is kept in contact with one longitudinal end of the slot under engagement of the stopper with the wheel, the external gear is kept fixed so as to be prevented from rotation relative to the internal gear; and actuating means for causing the stopper to be brought into engagement with the wheel against the force of the second biasing means when the webbing takes the passenger restraining position.

SUMMARY OF THE DRAWINGS

Other objects and advantagages of the present invention will become apparent from the following description when taken in conjunction with the accompanying drawings, in which.

DESCRIPTION OF THE EMBODIMENTS

Figure 1:
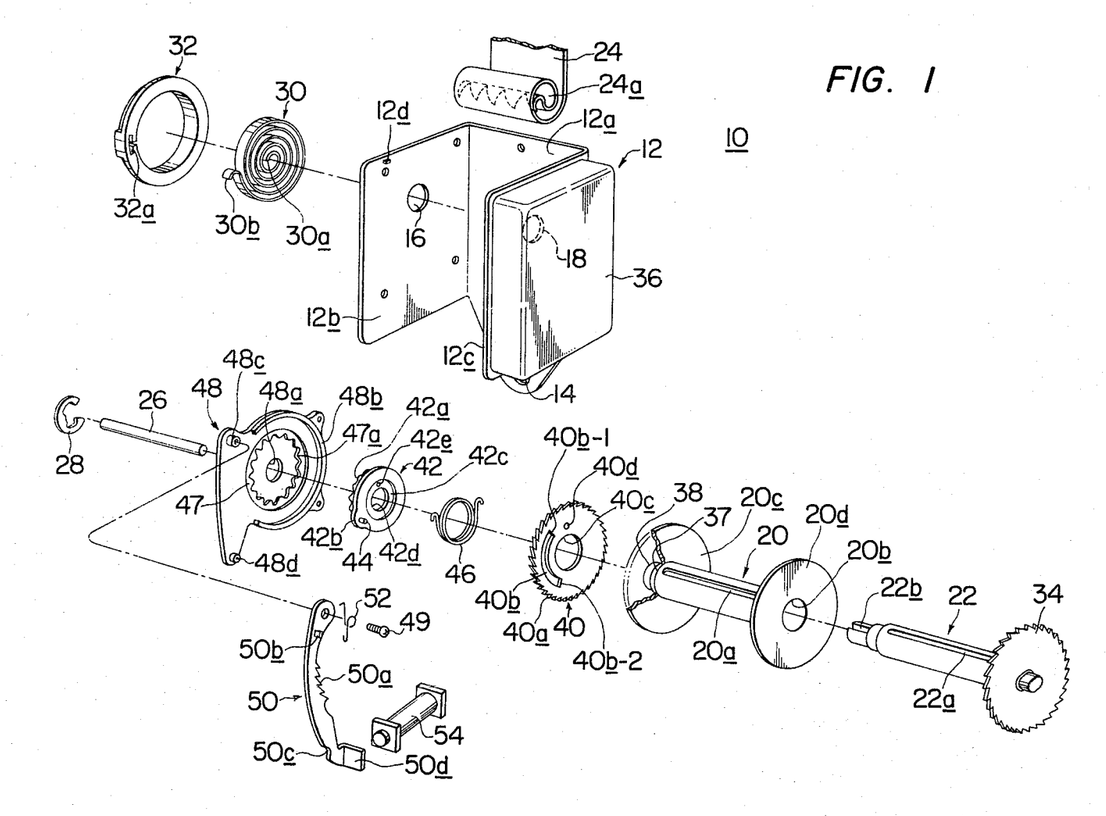
FIG. 1 is an exploded view of a first embodiment of a seat belt retractor of the invention.
Figure 2:
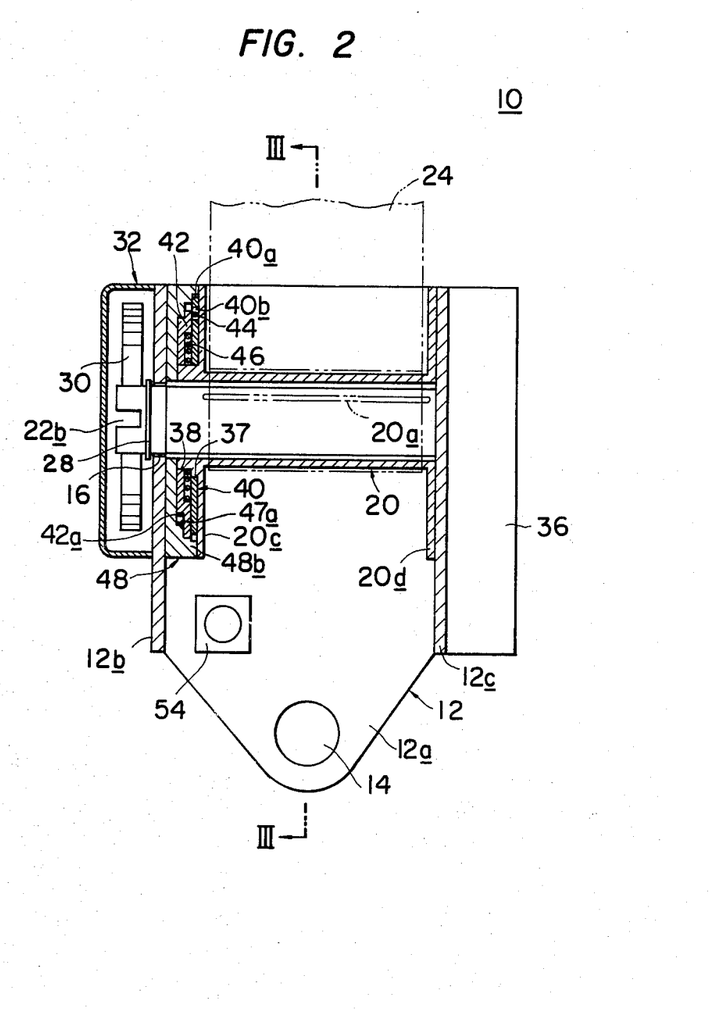
FIG. 2 is a front sectional view of the seat belt retractor, in assembled state, of FIG. 1.

Referring to FIGS. 1 to 3B, especially FIG. 1, there is illustrated a first embodiment of the seat belt retractor of the invention, which is generally designated by numeral 10.

The seat belt retractor 10 comprises a generally U-shaped housing 12 consisting of a base section 12a and a pair of side wall sections 12b and 12c. The housing 12 is adapted to connect to a suitable body portion or a seat portion of a vehicle by a bolt (not shown) passing through a hole 14 formed in the base section 12a. The wall sections 12b and 12c are formed with aligned holes 16 and 18 and receive therebetween a webbing take up real 20 in a manner that the axis of the reel 20 passes the centers of the holes 16 and 18. The reel 20 has on both ends circular flanges 20c and 20d, respectively. A hollow shaft 22 is passed through an axial hole 20b of the reel 20 with the ends thereof rotatably journaled in the holes 16 and 18 of the side wall sections 12b and 12c so that the reel 20 is rotatably supported in the housing 12. The hollow shaft 22 is formed with an axially extending slit 22a. A webbing 24 is passed through an axially extending slit 20a of the reel 20 and the slit 22a of the hollow shaft 22 allowing a looped end 24a thereof to be received in the hollow shaft 22. The looped end 24a is retained in the shaft 22 by a pin 26 passing therethrough, and the webbing 24 is wound on the reel 20. A snap ring 28 is fixed to a left portion of the shaft 22 which portion is projected beyond the wall section 12b as will be understood from FIG. 2. With this, the reel 20 and the hollow shaft 22 constitute a unit which is rotatable about the axis of the shaft 22 relative to the housing 12 in response to the winding and unwinding of the webbing 24 on and off the reel 20. Located outside of the wall section 12b of the housing 12 is a return spring 30 which is held in a cover 32 secured to the wall section 12b in a suitable manner. An inner end 30a of the spring 30 is held in a slit 22b formed in the left end of the shaft 22 and an outer end 30b of the same is held in a slit 32a formed in the cover 32 so that the shaft 22 and thus the reel 20 are biased to rotate in a direction to wind threreon the webbing 24, that is in a clockwise direction in FIG. 1. The right end of the shaft 22 has a ratchet wheel 34 fixed thereon and housed in a cover 36 secured in a suitable manner to the side wall section 12c of the housing 12. Although not shown in the drawing, several known parts are also housed in the cover 36, combining with the ratchet wheel 34, to form a so-called "Emergency Locking Mechanism" which functions to lock the shaft 22 stopping feeding of the webbing 24 from the reel 20 when subjected to a rapid deceleration caused, for example, by a vehicle collision.

The left end of the reel 20, which is located outboard of the flange 20c, has both a cylindrical concentric bearing portion 37 concentric with the reel 20 and a cylindrical eccentric bearing portion 38 eccentric with the reel 20. As will be seen from FIG. 2, the eccentric bearing portion 38 is positioned at the extreme end of the reel 20.

A ratchet wheel 40 having a plurality of external teeth 40a is journaled on the cylindrical concentric bearing portion 37 and an external gear 42 having at the left side thereof a plurality of external teeth 42a is journaled on the eccentric bearing portion 38. The external gear 42 has a projection 42b which radially outwardly extends beyond the addendum circle "t" (see FIG. 4) of the external teeth 42a. A stud or pin 44 is fixed to the projection 42b in a manner to project rightwardly in FIG. 1. The ratchet wheel 40 is formed with an arcuate slot 40b which is concentric with a center opening 40c of the ratchet wheel 40, the center opening 40c being a through hole through which the cylindrical concentric bearing portion 37 of the reel 20 is rotatably disposed. The stud 44 is spacedly received in the slot 40b when assembled. Thus, it is appreciated that relative rotation between the ratchet wheel 40 and the external gear 42 is possible within a certain range which is determined by the engagement of the stud 44 with longitudinal ends 40b-1 and 40b-2 of the slot 40b. As shown, the external gear 42 is formed with a circular recess 42c or depression concentric with a center opening 42d thereof, the opening 42d being the through hole in which the cylindrical eccentric bearing portion 38 of the reel 20 is rotatably disposed.

A spiral spring 46 is received in the circular recess 42c of the external gear. Both ends (no numerals) of the spring 46 are respectively hooked to holes 40d and 42e respectively formed in the ratchet wheel 40 and the external gear 42 so that the ratchet wheel 40 is biased to rotate in the clockwise direction, in FIG. 1, relative to the external gear 42. Thus, in normal condition, the stud 44 is kept engaged with the end 40b-2 of the arcuate slot 40b.

Meshing with the external teeth 42a of the external gear 42 is an internal gear 47 which is integrally formed on an inside surface of a bracket member 48 secured by bolts (not shown) to the inside surface of the side wall section 12b of the housing 12. The bracket member 48 has a central opening 48a concentric with the internal gear 47, through which opening the left end of the hollow shaft 22 is lossely passed, as is seen from FIG. 2. The number of the teeth of the internal gear 47 is greater than that of the teeth 42a of the external gear 42 so as to allow the external gear 42 to make its orbit in the internal gear 47. Designated by numeral 48b is a side wall formed on the bracket member 48.

A stopping arm 50 having a toothed middle section 50a is pivotally connected by a bolt 49 at its upper section to a shaft 48c mounted on the bracket member 48 in such an arrangement that the toothed middle section 50a of the arm 50 is brought into meshing engagement with the external teeth 40a of the ratchet wheel 40 when the arm 50 is swung toward the ratchet wheel 40 a predetermined angle. Preferably, the teeth 50a and 40a of the stopping arm 50 and the ratchet wheel 40 are such constructed that upon engagement of these teeth, the rotational movement of the ratchet wheel 40 in the clockwise direction is completely suppressed. For this, each of the teeth 50a and 40a may have a saw-tooth form, as shown. A spring 52 having ends (no numeral) respectively engaged with a projection 50b of the arm 50 and a projection 12d of the housing 12 is disposed about the shaft 48c to bias the stopping arm 50 to swing in a direction to move away from the ratchet wheel 40. This movement of the arm 50 is limited by engaging a recessed section 50c thereof with a stop pin 48d formed on the bracket member 48. An electromagnet 54 is fixed to the housing 12 at a place facing a lug 50d which is formed at the lower section of the stopping arm 50. Thus, upon energization of the electromagnet 54, the stopping arm 50 is forced to swing toward the ratchet wheel 40 against the force of the spring 52 to provide the meshing engagement of the teeth 50a of the arm 50 with those of the ratchet wheel 40.

Although not shown in the drawings, the webbing 24 is provided with a known tongue and buckle unit having a switch. The switch is electrically connected via a battery to the electromagnet 54 in such a manner that when the tongue and the buckle are engaged with each other to restrain the passenger with the webbing, energization of the electromagnet 54 is caused.

With the above, the seat belt retractor 10 of the first embodiment of the invention will operate as follows: (Description of the operation of the "Emergency Locking Mechanism" housed in the cover 36 will be omitted since such mechanism is well known to those skilled in the art.)

Figure 3A:
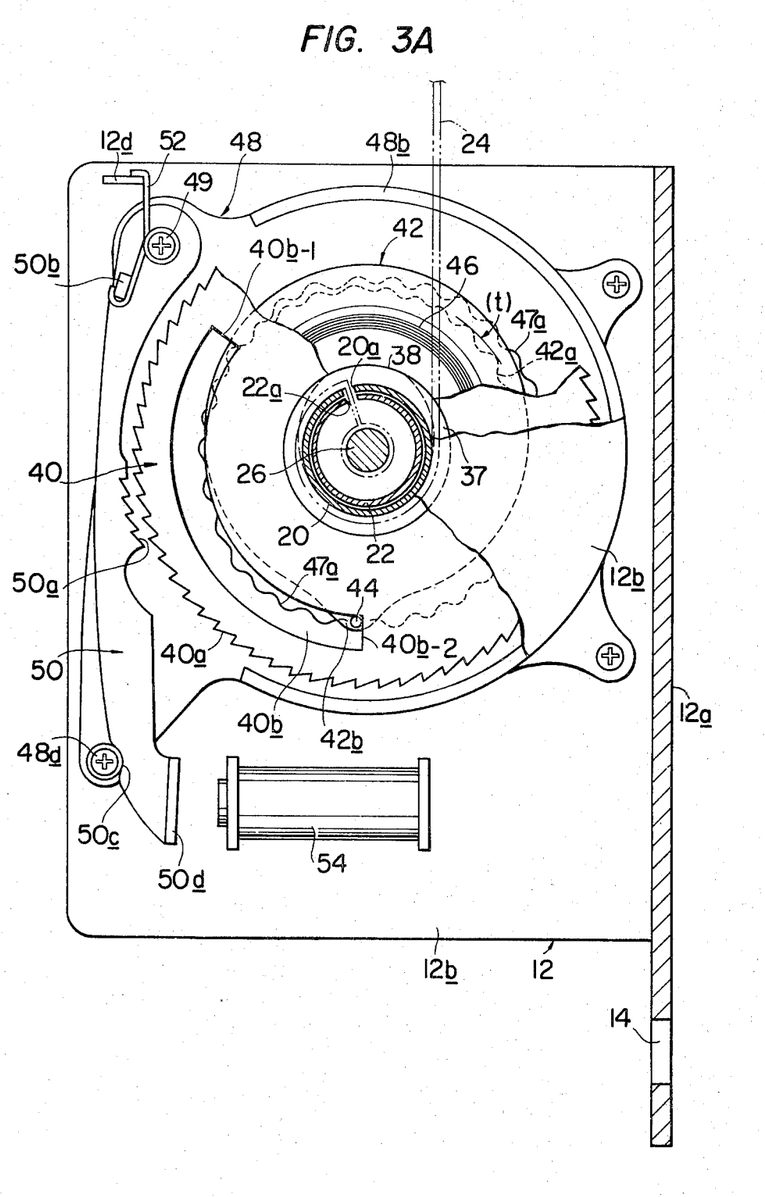
FIGS. 3A and 3B are side, but partially sectional views taken along the line III—III of FIG. 2 depicting operation modes of the retractor, respectively.

When the tongue and the buckle are kept disengaged causing deenergization of the electromagnet 54, the stopping arm 50 takes its dormant position releasing the ratchet wheel 40 in a manner as shown in FIG. 3A, causing the webbing 24 to be wound up on the webbing take-up reel 20 by the force of the return spring 30. During rotation of the reel 20 in the clockwise direction in FIG. 3A, that is in the direction to wind up the webbing 24, the external gear 42 orbits in the clockwise direction around the center of the internal gear 47 while engaging the external teeth 42a thereof with the teeth 47a of the internal gear 47 to cause rotation of the external gear 42 around the center thereof in the counterclockwise direction. It is thus to be noted that during this movement of the external gear 42, the stud 44 on the gear 42 moves around the center of the internal gear 47 in the counterclockwise direction while describing an epitrochoidal path in the slot 40b, urging or pushing the end 40b-2 of the slot 40b resulting in that the ratchet wheel 40 rotates about the concentric bearing portion 37 of the reel 20 in the counterclockwise direction. Thus, under taking up of the webbing 24, the reel 20 and the ratchet wheel 40 rotate in opposite directions. Under this condition, the webbing 24 wound on the reel 20 can be drawn out from the reel 20 against the force of the return spring 30 in a manner that the reel 20 rotates in the counterclockwise direction and the ratchet wheel 40 rotates in the clockwise direction. (It should be noted that the stud 44 on the external gear 42 is forced to engage with the end 40b-2 of the slot 40b of the ratchet wheel 40 by the nature of the spiral spring 46.)

Figure 3B:
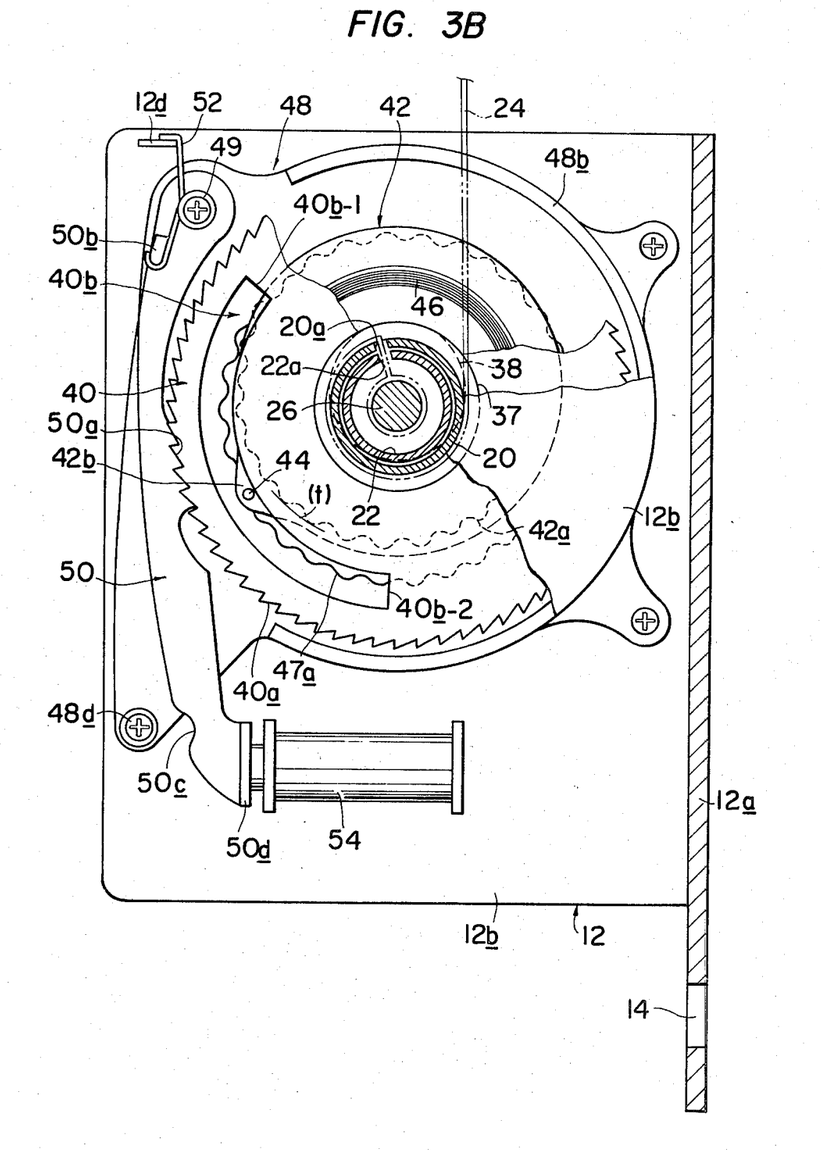

When the tongue and the buckle are engaged, after drawing sufficient webbing out from the reel 20 to permit donning of the webbing 24 to restrain the seated passenger, the switch in the tongue and buckle unit closes causing the energization of the electromagnet 54 thereby pulling the stopping arm 50 toward the electromagnet 54 against the biasing force of the spring 52, as shown in FIG. 3B. Thus, the toothed middle section 50a of the arm 50 is brought into meshing engagement with the teeth 40a of the ratchet wheel 40 to prevent rotation of the same in both clockwise and counterclockwise directions. The stopping arm 50 and the ratchet wheel 40 thus cooperate to provide the retractor arrangement with a position memory wherein the just mentioned engagement of the stopping arm 50 and the ratchet wheel 40 establish an initial "memorizing or memory" position. The operation and function of the position memory will become clearer as the disclosure proceeds.

Now, since the rotation of the ratchet wheel 40 is suppressed, the epitrochoidal movement of the stud 44 in the counterclockwise direction in the slot 40b, which causes the reel 20 to rotate in the direction to wind thereon the webbing 24, is prevented due to blocking engagement of the stud 44 with the end 40b-2 of the slot 40b. Thus, the webbing winding up motion of the reel 20 is no more provided. This means that the passenger wearing the webbing 24 is applied with substantially no pressure from the webbing 24 as long as the passenger keeps his or her normal seated position viz, sits back against the backrest of the seat.

Under this condition, if the seated passenger leans forward as for example in opening the glove locker, the webbing 24 will be drawn off the reel 18 against the force of the return spring 30 and the spiral spring 46, rotating the reel 20 in the counterclockwise direction. This counterclockwise rotation of the reel 20 is permitted since this rotation causes the stud 44 on the planetary gear 42 to travel in the slot 40b from the end 40b-2 toward the other end 40b-1 through the position shown in FIG. 3B. Of course, when the seated passenger stops the forward moving, the stud 44 stops due to the non-movement of the webbing 24.

When the wearer returns to the normal seated position, the length of the webbing 24 corresponding to the returning movement of the passenger is wound up on the reel 20 by the action of the return spring 30. During this winding motion of the reel 20, the stud 44 comes back to and finally engages with the end 40b-2 of the slot 40b to press the same. However, since the ratchet wheel 40 is locked by the stopping arm 50 in this condition, the pressing of the stud 44 against the end 42b-2 does not cause the rotation of the ratchet wheel 40. This means that the webbing 24 returns to its previously set or memorized position.

When the wearer disconnects the tongue from the buckle, the electromagnet 54 becomes deenergized thereby releasing the stopping arm 50 from the ratchet wheel 40 by the aid of the spring 52. Thus, the reel 20 is permitted to rotate in the clockwise direction by the force of the return spring 30, winding up thereon the webbing 24.

Now, it should be noted that if the vehicle on which the seat belt retractor 10 is mounted is subjected to a vehicle collision, the drawing of the webbing 24 out from the retractor 10 is completely suppressed by the function of the "Emergency Locking Mechanism" to protect the webbing wearer from being thrown forwardly.

The following description is directed to advantages and merits which are given from the positional relationship between the stud 44 and the external gear 42 on which the stud 44 is mounted. For easy understanding of these advantages and merits, the case of the aforementioned U.S. patent application Ser. No. 933,068 will be described, with aid of FIG. 4, prior to that of the first embodiment of the invention.

Figure 4:
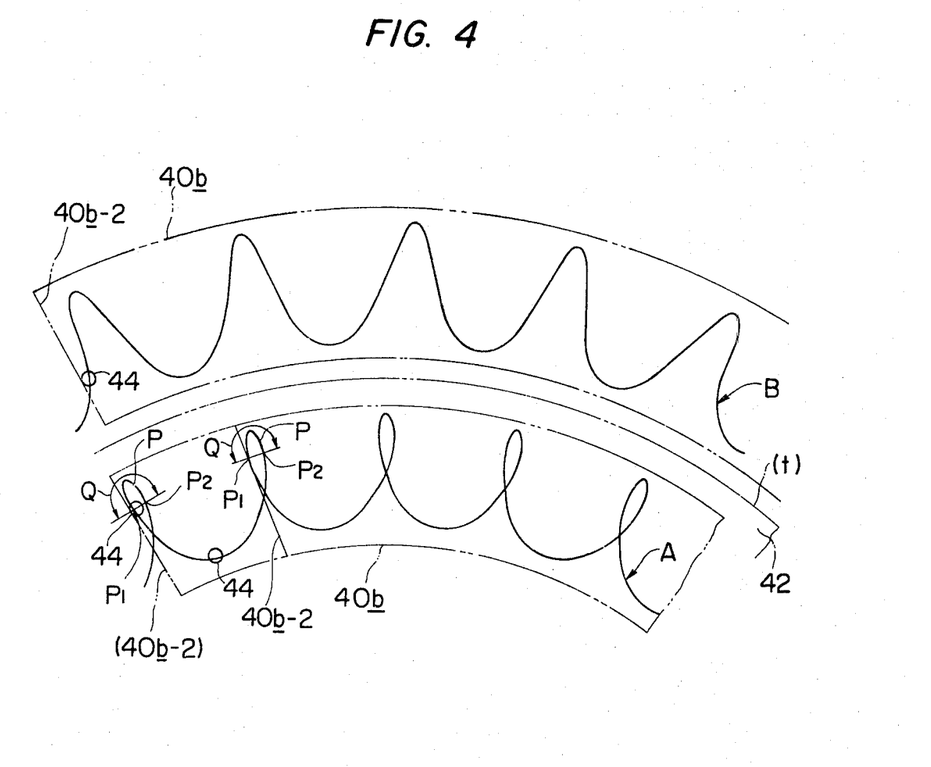
FIG. 4 shows hyposuperiortrochoidal path and hypoinferiortrochoidal path which are swept out by a stud incorporated with the retractor of the invention and a stud incorporated with a conventional retractor, respectively.

In case of the above-mentioned Patent Application, the stud corresponding to the stud 44 of the invention is positioned within the addendum circle (t) of the external teeth of the external gear (42). Thus, the stud (44) will describe the hypoinferiortrochoidal path "A", as shown in FIG. 4, during the rotation of the external gear (42). As will be seen from this drawing, the path "A" has a section "P" defined between "P$_1$" and "P$_2$" within which the stud (44) moves, though slightly, in a direction opposite to the general progressing direction of the stud (44). In this case, if the stud (44) takes its position within the section "P" more specifically within the range denoted by the reference "Q" upon engagement of the tongue with the buckle, the stud (44) is caused to move backwardly by taking the same path to the position denoted by reference "P$_2$", to make a clearance between the stud 44 and the end 40b-2. This movement of the stud (44) will cause a slight rotation of the external gear (42) about the center of the internal gear (47) in the direction to allow the webbing taking up reel (20) to wind thereon the webbing (24), so that the webbing (24) applies the wearer with a slight pressure.

In case of the first embodiment of the invention, the stud 44 is positioned outside the addendum circle (t) of the external teeth 42a of the external gear 42. Thus, the stud 44 describes a hyposuperiortrochoidal path "B" such as shown in FIG. 4, during the rotation of the external gear 42. In this path "B", there is no section within which the stud 44 moves in the opposite direction. Thus, the above-mentioned unwanted phenomenon originating from the additional movement of the stud does not occur. In this embodiment, the memorized position is instantly and assuredly set when the tongue is engaged with the buckle.

Figure 5:
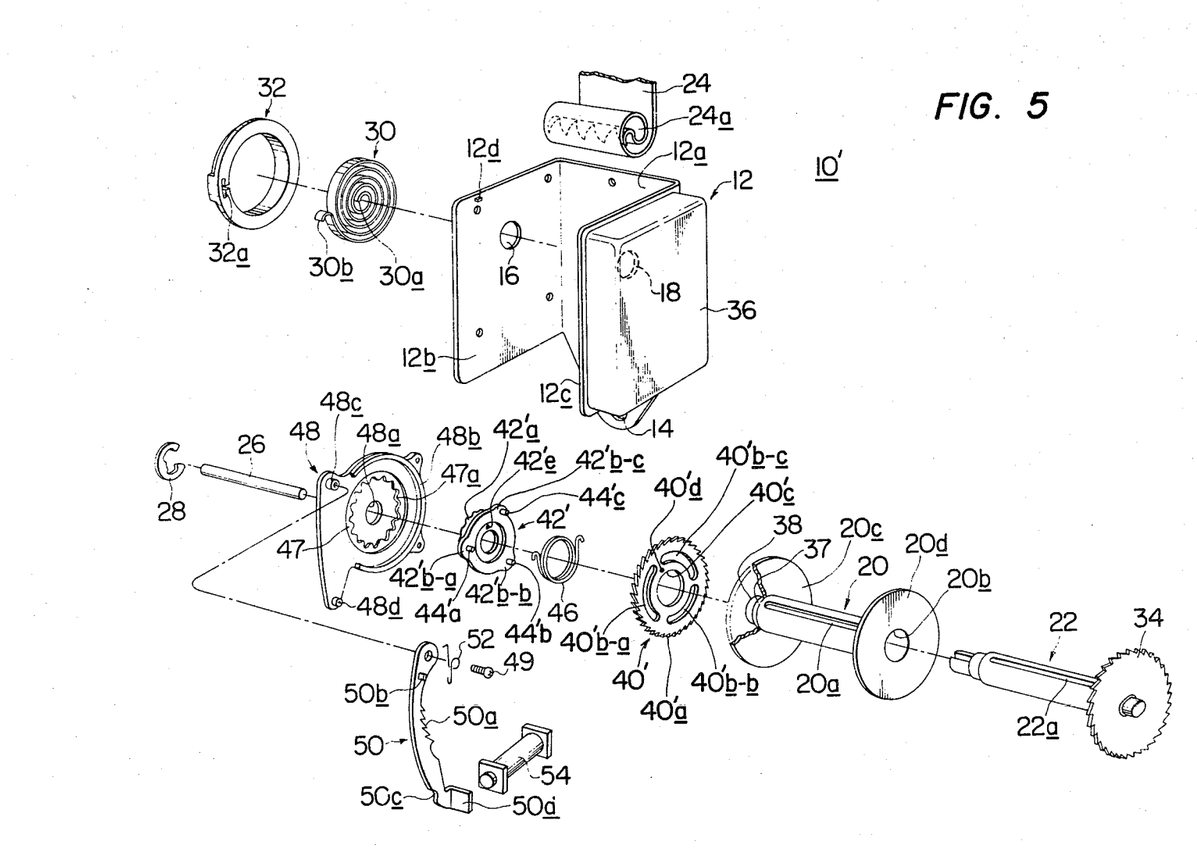
FIG. 5 is an exploded view of a second embodiment of the seat belt retractor of the invention.
Figure 6:
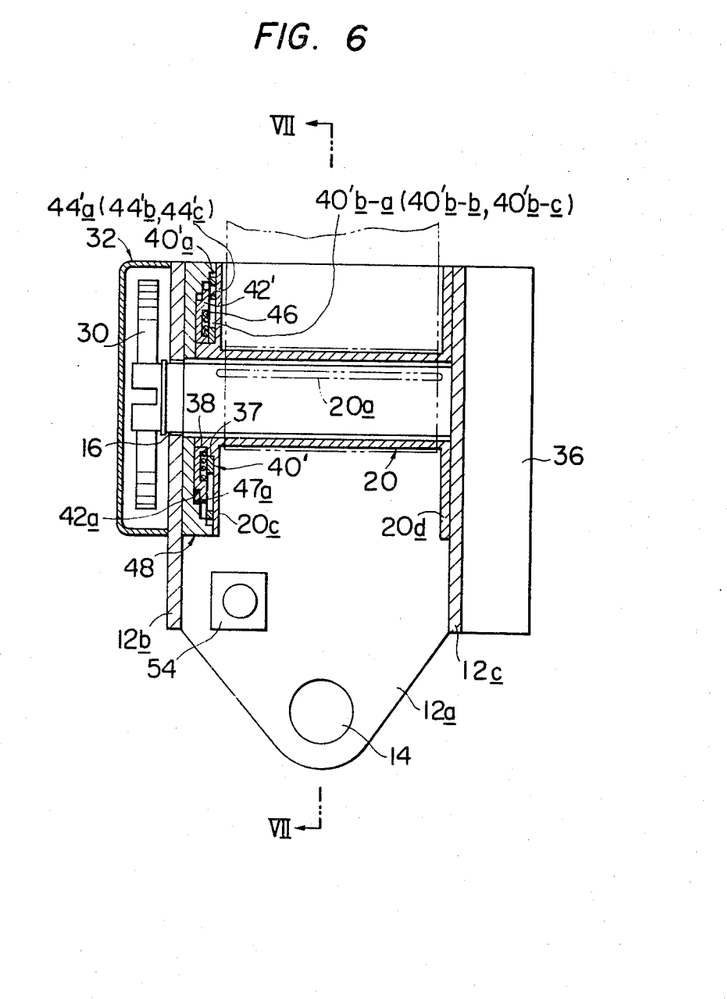
FIG. 6 is a front sectional view of the seat belt retractor, in assembled state, of FIG. 5.
Figure 7A:
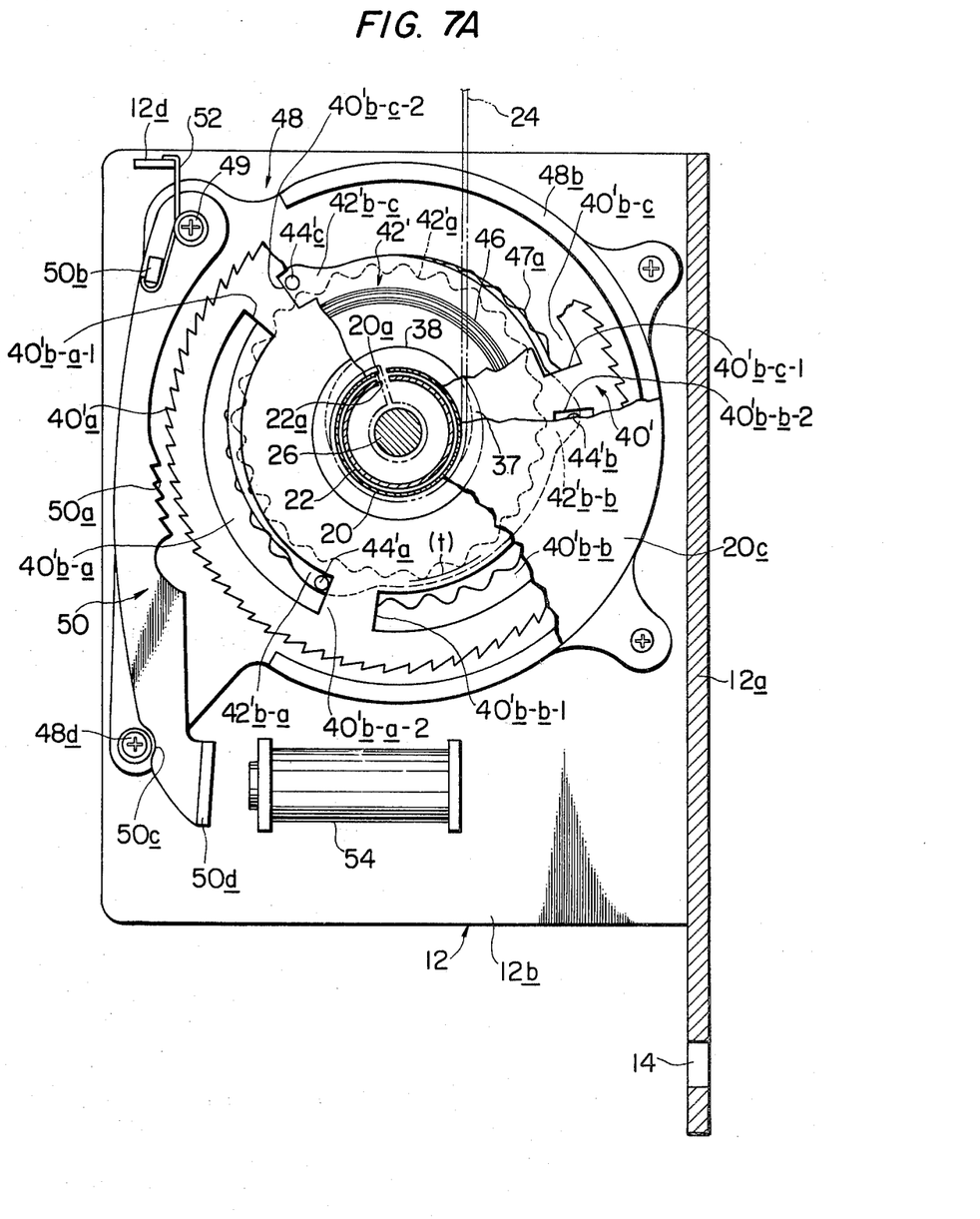
FIGS. 7A to 7B are side but partially sectional views taken along the line VII—VII of FIG. 6, depicting operations of the retractor, respectively.
Figure 7B:
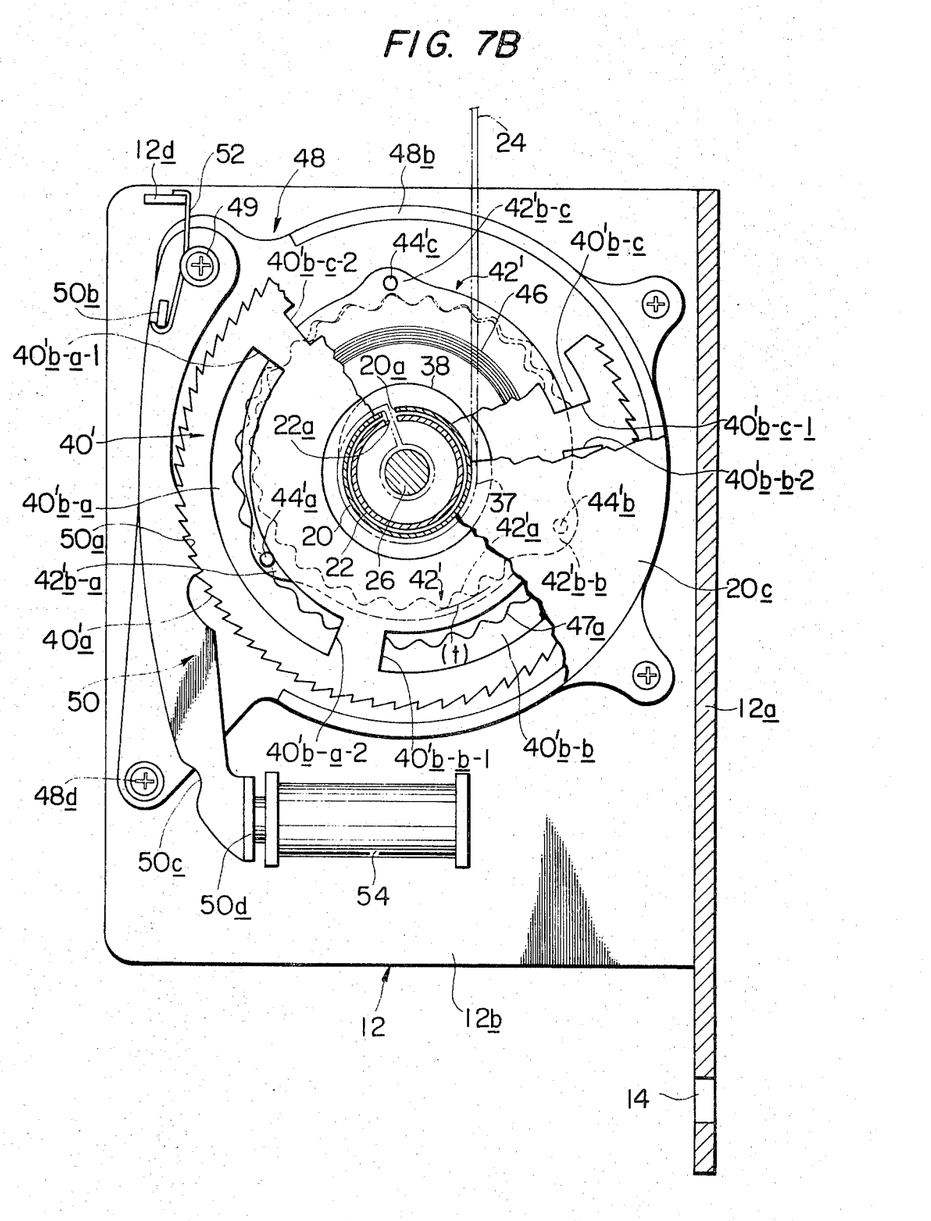

Referring to FIGS. 5 to 7B, especially FIG. 5, there is illustrated a second embodiment of the seat belt retractor of the present invention, which is generally designated by numeral 10'.

The seat belt retractor 10' of this embodiment comprises generally the same parts as that 10 of the first embodiment except the ratchet wheel and the external gear. Thus, the detailed explanation of construction and arrangement of the same parts will be omitted from the following and these same parts will be denoted by the same numerals as in the case of the first embodiment.

As is best seen in FIG. 5, the external gear 42' journaled on the eccentric bearing portion 38 of the reel 20 has three radially outwardly extending, preferably evenly spaced, projections 42'b-a, 42'b—b and 42'b-c, as shown. On these projections are tightly and respectively fixed studs or pins 44'a, 44'b and 44'c each of which is positioned outside the addendum circle (t) (see FIG. 7A or 7B) of the external teeth 42'a. The ratchet wheel 40' rotatably disposed about the concentric bearing portion 37 of the reel 20 is formed with three circularly arranged arcuate slots 40'b-a, 40'b—b and 40'b-c into which the studs 44'a, 44'b and 44'c of the external gear 42' are spacedly received. The studs 44'a, 44'b and 44'c and the slots 40'b-a, 40'b—b and 40'b-c are so arranged and formed that these three studs can be brought into contact, at the same time, with the respective ends 40'b-a-2, 40'b—b-2, and 40'b-c-2 (which are corresponding to the end 40b-2 of the first embodiment) of their corresponding slots in the ratchet wheel 40'.

Since the operation of the seat belt retractor 10' of this second embodiment is quite similar to that of the first embodiment, the explanation of it will be omitted. However, some experiments have revealed that in the retractor of this second embodiment, more reliable and assured memorizing function is achieved, in comparison with that of the first embodiment.

Figure 8:
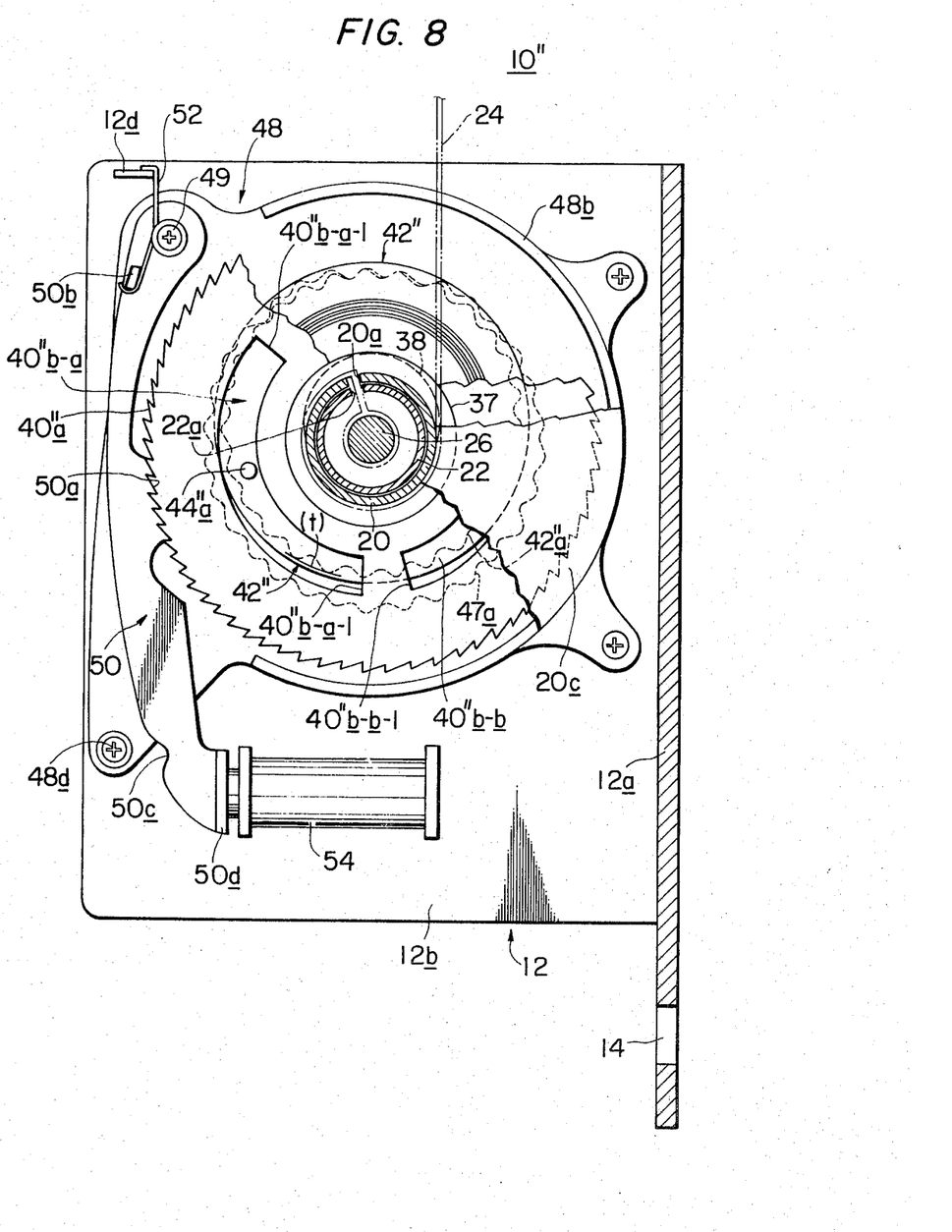
FIG. 8 is a view similar to FIGS. 7A and 7B, but shows a third embodiment of the seat belt retractor of the invention.

Referring to FIG. 8, there is illustrated a third embodiment generally designated by numeral 10''. The seat belt retractor 10'' has generally the same construction and arrangement as the second embodiment except for locations of the studs 44''a, 44''b and 44''c on the external gear 42'' and the slots 40''b-a, 40''b-b and 40''b-c of the ratchet wheel 40''.

Figure 9:
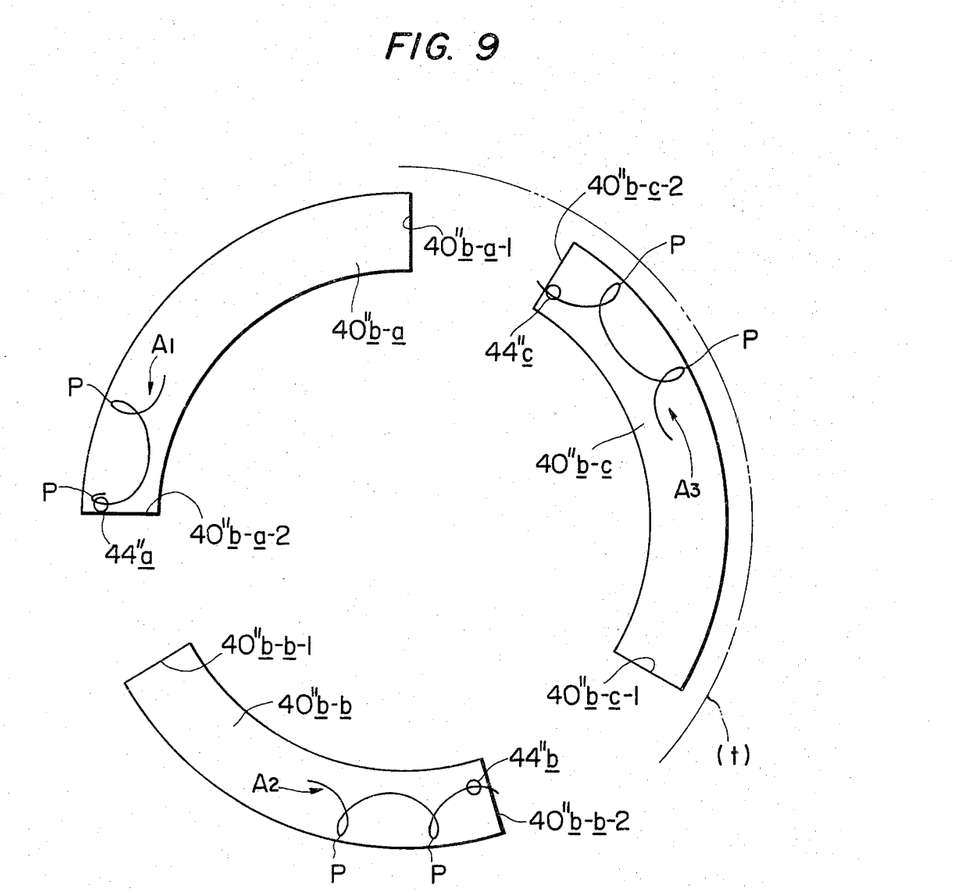
FIG. 9 is a view schematically showing a part, in an enlarged scale, of the retractor of FIG. 8, depicting the positional relationship between three studs fixed on an external gear and three slots formed in a ratchet wheel.

The studs on the external gear 42'' are positioned within the addendum circle (t) of the external teeth 42''a of the external gear 42'', as is understood from the drawing. Furthermore, in this embodiment, the studs 44''a, 44''b and 44''c and the slots 40''b-a, 40''b—b and 40''b-c are so arranged and formed that upon contact of one (44''a, for example) of the studs with the end (40''b-a-2) of the corresponding slot (40''b-a) at the section "P" of the path (A$_1$) described by the stud (44''a), at least one (44''c) of the other studs is kept in contact with the end (40''b-c-2) of the corresponding slot (40''b-c) at a section other than the section "P" of the path (A$_3$) described by the stud (44''c). This is depicted by FIG. 9. (As has been mentioned before, the section "P" is the zone within which the stud moves in the direction opposite to the general progressing direction of the same causing the slight rotation of the reel in the webbing taking up direction that is in the direction to apply the webbing wearer with a slight pressure).

Since the stopping of rotation of the external gear 42'' is made always by at least a stud which is located in a section other than the section "P" of the hypoinferiortrochoidal path described by the same, the unwanted additional winding up motion of the webbing take up reel caused by the rotation of the external gear 42'' is assuredly prevented. Thus, the memorized position of the webbing 24 which is set upon buckling of the same is assuredly maintained, so that the webbing wearer is not applied with pressure from the webbing 24 so long as the wearer keeps his or her normal seated position viz., sits back against the backrest of the seat.

From the above, it will be appreciated that according to the present invention, the excessive winding motion of the webbing take up reel causing application of slight but uncomfortable pressure upon the wearer, which has been encountered in the aforementioned retractor disclosed in U.S. patent application Ser. No. 933,068, is not provided. In other words, in the invention, the memorized position of the webbing 24 is instantly and accurately set upon buckling of the webbing 24.

What is claimed is:

1. A belt retractor for a safety seat belt arrangement having a webbing, comprising:

a housing;

a reel rotatably mounted in said housing and winding thereon said webbing when said reel is rotated about the axis thereof in one direction, said reel being formed thereon with first and second cylindrical bearing portions which are respectively concentric and eccentric with respect to the longitudinal axis of said reel;

first biasing means for biasing said reel to rotate about the axis of the same in said one direction;

a wheel journaled on said first cylindrical bearing portion;

a stopper for stopping rotation of said wheel about the first cylindrical bearing portion when engaged with said wheel;

second biasing means for biasing said stopper to move in a direction to be disengaged from said wheel;

an external gear journaled on said second cylindrical bearing portion of said reel;

third biasing means for biasing said wheel to rotate in the same direction as said one direction relative to said external gear;

an internal gear stationarily connected to said housing at a position to be operatively engaged with the external gear;

memorizing means including at least one stud fixed to said external gear and at least one arcuate slot formed in said wheel, said stud being spacedly received in said slot and said arcuate slot being concentric with said first cylindrical bearing portion, said stud and said slot being so arranged and formed that when said stud is kept in contact with one longitudinal end of said slot under engagement of said stopper with said wheel, said external gear becomes fixed so as to be prevented from rotation relative to said internal gear; and actuating means for causing said stopper to be brought into engagement with said wheel against the force of said second biasing means when said webbing takes the passenger restraining position.

2. A belt retractor as claimed in claim 1, in which said stud of said memorizing means is positioned outside the addendum circle of the external teeth of said external gear.

3. A belt retractor as claimed in claim 2, in which said stud is fixed to a projection which radially outwardly extends beyond the addendum circle of the external teeth of said external gear.

4. A belt retractor as claimed in claim 1, in which said memorizing means includes a plurality of studs fixed to said external gear and a plurality of circularly arranged arcuate slots formed in said wheel, the number of said slots equalling the number of said studs, said studs being spacedly received in said slots respectively and said slots being concentric with said first cylindrical bearing portion.

5. A belt retractor as claimed in claim 4, in which said studs are positioned outside the addendum circle of the external teeth of said external gear.

6. A belt retractor as claimed in claim 4, in which said studs are positioned inside the addendum circle of the external teeth of said external gear.

* * * * *